3,403,209
FUNGICIDAL AND BACTERICIDAL COMPOSITIONS AND METHODS EMPLOYING ISOTHIAZOLECARBOXYLATES
Jerold W. Bushong, Middleport, N.Y., and Gert P. Volpp, Princeton, N.J., assignors to FMC Corporation, New York, N.Y., a corporation of Delaware
No Drawing. Continuation-in-part of application Ser. No. 462,428, June 8, 1965. This application May 11, 1966, Ser. No. 549,152
26 Claims. (Cl. 424—270)

This application is a continuation-in-part of pending application Ser. No. 462,428, filed June 8, 1965, now abandoned.

This invention relates to novel compositions for the control of pathogenic organisms, and to new methods of combatting fungal and bacterial organisms by application of said new compositions. Particularly, this invention relates to new fungicidal and bactericidal compositions containing certain isothiazolecarboxylates as active ingredients, and to new methods of controlling pathogenic organisms in plants by applying these compositions to the situs of growing plants, whereby systemic plant protection is obtained by translocation of the active agent within the plant.

Plant diseases caused by pathogenic organisms, including fungi and bacteria, have been known for many years. Many of these plant diseases remain uncontrolled or inadequately controlled, and much effort has been expended and continues to be expended in the search for chemicals capable of providing more effective control of these diseases.

The term "fungicidal" includes not only the property of destroying fungi but also the property of inhibiting the germination of the spores of fungi, a property sometimes referred to as fungistatic. The term "bactericidal" includes, similarly, these properties as applied to bacteria. The difficulty in finding effective plant bactericides and fungicides resides in the innate nature of these pathogenic organisms: their small size enables them to penetrate minute wounds or natural openings in plant tissues, their power of propagation allows them to become established rapidly and to spread rapidly, and they may be disseminated widely by wind, rain, irrigation water, and on seeds, tubers, and other propagative parts of plants. It is apparent that the most satisfactory method for control of these pathogenic organisms would be by means of systemic compounds which would be mobile within the plant and thus protect against or eradicate infections at sites removed from, as well as at, the site of application.

Systemic plant protectant compositions are those which are designed to protect a plant from attack by pathogenic organisms by a mechanism whereby the active ingredient is taken up by the plant through its roots, seeds, leaves, stems, or even bark, and translocated throughout the plant system. The following requirements for systemic fungicides have been stated in an article on this subject by R. J. W. Cremlyn (J. Sci. Food Agric., 12, 805–12 (1961)):

"(1) It must be fungicidal per se, or be converted into an active fungitoxicant within the host tissue. Also some compounds appear to act by modifying host resistance. . . .

"(2) It must have very low phytotoxicity; this criterion is specially important in a systemic fungicide, because the chemical is brought into intimate contact with the host plant.

"(3) It must be capable of being taken up by the roots or leaves of the plant and then translocated. . . ."

Similar requirements obviously apply to systemic bactericides. The need for chemical control of these pathogenic organisms continues, and although it is recognized that systemic agents offer the most useful type of control, they are little used because of the difficulty of finding compounds which meet all three of the requirements as set forth above.

We have now discovered that certain isothiazolecarboxylates do fulfill these requirements, and are useful and effective agents for the systemic control of plant fungal and bacterial diseases. These chemicals have been demonstrated to move within the plant following absorption, and to provide long-lasting protection to seeds, seedlings and growing plants. Many of these chemicals also provide effective control of fungi and bacteria by topical application, such that a broad spectrum of effectiveness may be obtained.

The isothiazolecarboxylates of this invention have the structure:

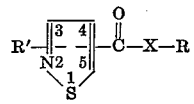

wherein R is hydrogen or a saturated or unsaturated primary or secondary aliphatic radical of one to about fourteen carbon atoms, a metal, or a protonated amine; X is oxygen or sulfur; and R′ is hydrogen, methyl, or a methyl derivative. The groups R′ and —C(O)XR may each be attached to the isothiazole ring at any of the available postions, the numbering of which is shown above. In certain preferred compositions, —R′ is attached at the 3- or 4-position, and —C(O)XR is attached at the 4- or 5-position.

Suitable substituents R include methyl, ethyl, propyl, isoproyl, butyl, sec-butyl, isobutyl, pentyl, 1-methylbutyl, 2-methylbutyl, hexyl, 2-chloroethyl, allyl, propynyl, 2-butynylene, 1-nitro-2-propyl, 2-nitroethyl, 2-ethoxyethyl, 2-ethylhexyl, octyl, and dodecyl radicals; metals including sodium, lithium, potassium, calcium, strontium, manganese, cobalt, copper, and zinc; and protonated amines such as ammonium, triethylammonium, pyridinium, trimethylammonium, butylammonium, and morpholinium. Suitable methyl derivatives included in R′ are hydroxymethyl, acetoxymethyl, dimethoxymethyl, carboxaldehyde, and carbaldoxime radicals.

The active chemical compounds described herein may be prepared by a variety of synthetic procedures, including procedures analogous to known methods for the synthesis of the isothiazole ring system. These methods include the oxidation of benzo(d)isothiazoles (Adams and Slack, Chem. & Ind., 1956, 1232); addition of thiosulfate or thiocyanic acid to ethynyl ketones, followed by elimination of sulfurous or hydrocyanic acid (Wille et al., Angew. Chem., Internat. Ed., 1, 335 (1962)); and vapor phase reaction of olefins, acetylenes or alcohols with sulfur dioxide and ammonia (Hubenett et al., Angew. Chem., Internat. Ed., 1, 508 (1962); ibid., 2, 325, 714–9 (1963)). Methods for preparation of the desired isothiazolecarboxylic acids useful to form the esters, salts and ammoniates of this invention include: lithiation of isothiazole or 3- or 4-alkylisothiazoles to produce the corresponding 5-lithium compound, which is reacted with carbon dioxide to give the corresponding 5-isothiazolecarboxylic acid (Caton et al., J. Chem. Soc., 1964, 446); bromination of 3-methylisothiazole to 3-dibromomethylisothiazole, which is hydrolyzed to 3-formylisothiazole and this compound oxidized with silver oxide to give 3-isothiazolecarboxylic acid (Jones et al., J. Chem. Soc., 1964, 3114); isothiazole-4,5-dicarboxylic acid, prepared by permanganate oxidation of 5-aminobenzo(d)isothiazole is decarboxylated to produce 4-isothiazolecarboxylic acid (Adams and Slack, J. Chem. Soc., 1959, 3061); 4-bromo-3-methylisothiazole reacts with cuprous cyanide to give 4-cyano-3-methylisothiazole which is hydrolyzed to the corresponding 3-methyl-4-isothiazolecarboxylic acid (Belgian Patent 632,394, Nov. 18, 1963). By appropriate selection of starting materials, the desired acid is readily produced by known procedures.

The isothiazolecarboxylic acids readily form the corresponding esters, metallic salts, and amine salts. Standard procedures may be employed for carrying out these reactions. Thus, esterification may be accomplished by reaction of the acid, acid anhydride, acid halide, or salt with the appropriate alcohol or other alkylating agent such as the aliphatic halide or sulphate, usually in the presence of a catalyst. The ammonium salts are readily formed by reaction of the acid with the desired amine. The metallic salts are produced by reaction of the acid with the appropriate base. The thiolo derivatives may be prepared from the corresponding acid halides and the appropriate thio alcohols by standard procedures. A useful process for the preparation of 3-alkyl-4-isothiazolecarboxylates is described by Buttimore et al., J. Chem. Soc., 1963, 2032–2039. Another useful procedure, developed by R. W. Woodward and G. P. Volpp, involves the addition of thiophosgene to methyl beta-aminocrotonates (Woodward, The Harvey Lectures, Series 59, Academic Press, New York and London, 1965, 34–37). Obviously the reactants and synthetic routes selected will be determined by the final products desired.

By application of an effective amount and concentration of the active agents described herein to the situs of growing plants, useful and economically important control of plant diseases caused by many plant-infesting pathogens can be obtained. Among the plant-infesting pathogens are the following genera of bacteria and fungi: Corynebacterium, Erwinia, Xanthomonas, Pseudomonas, Agrobacterium, Rhizobium, and Streptomyces; and Uromyces, Venturia, Colletotrichum, Fusarium, Verticillium, Alternaria, Cercospora, and Diplodia.

The preparation and properties of representative compounds of this invention are shown in the following examples, which are illustrative but not limitative of the invention. All temperatures are in degrees centigrade.

Example 1.—Synthesis of methyl 3-methyl-4-isothiazolecarboxylate

To a stirred solution of 57.5 grams of methyl beta-amino-crotonate and 126 g. of triethylamine in 3 l. of absolute ether, 57.5 g. of thiophosgene was gradually added while the solution was cooled in an ice bath. After completion of the addition, the reaction mixture was kept cold for another 1–2 hours, then was permitted to warm up gradually to room temperature. The pH was adjusted to 5–6 by the addition of 225 ml. of 2 N hydrochloric acid, and the mixture was subjected to a rapid steam distillation. The aqueous distillate was extracted with ether. Removal of the ether after drying yielded 40.5 g. of methyl 3-methyl-4-isothiazolecarboxylate, identical with the product described by Buttimore et al., J. Chem. Soc., 1963, 2038.

Example 2.—Systemic bactericidal activity of methyl 3-methyl-4-isothiazolecarboxylate Systemic bactericidal activity was demonstrated as follows: A wettable powder formulation of methyl 3-methyl-4-isothiazolecarboxylate was prepared by blending 25% by weight of the chemical with 72% of attapulgite clay, 1.5% sodium lignosulfonate, and 1.5% alkylnaphthalenesulfonate. Suspensions in water of methyl 3-methyl-4-isothiazolecarboxylate containing 600, 300, and 150 p.p.m. of active ingredient were prepared by adding the appropriate amount of the wettable powder formulation, and 35 ml. of each suspension was poured onto the soil of individually-potted tomato plants of the Bonnie Best variety, to produce applied dosages equivalent to 21.0, 10.5, and 5.25 mg. of the isothiazole per plant. After two days the foliage of the plants was inoculated with the pathogen Xanthomonas vesicatoria, the causative agent of tomato bacterial spot. The plants were maintained in the greenhouse for about ten days, and the degree of control of the disease was determined by comparison of the treated with the untreated plants. Results are shown in Table 1. The count of the number of lesions per leaf represents the average of two replicates per leaf, and the figures for the untreated plants represent the average of four replicates per leaf.

TABLE I.—SYSTEMIC CONTROL OF BACTERIAL SPOT OF TOMATOES

| Concentration (mg./plant) | Average Number of Lesions per Leaf | | | Average Control, Percent |
|---|---|---|---|---|
| | Leaf 1 | Leaf 2 | Leaf 3 | |
| 21.0 | 9 | 23 | 9 | 83 |
| 10.5 | 12 | 9 | 16 | 84 |
| 5.25 | 33 | 36 | 35 | 57 |
| Untreated | 63 | 87 | 91 | 0 |

Example 3.—Systemic fungicidal activity of methyl 3-methyl-4-isothiazolecarboxylate The systemic fungicidal activity of methyl 3-methyl-4-isothiazolecarboxylate was demonstrated as follows: Suspensions of methyl 3-methyl-4-isothiazolecarboxylate in water were prepared as in Example 2, and poured onto the soil of individually-potted bean plants in amounts equivalent to 15.0 and 7.5 mg. of the isothiazole per plant. After two days, the foliage was inoculated with the bean rust pathogen (Uromyces phaseoli var. typica). The inoculated plants were kept in a humidity chamber at 18° C. for forty-eight hours, and then removed to the greenhouse. The degree of control of this disease was determined about ten days after inoculation of the foliage, by comparison of treated with untreated plants. Results are shown in Table 2, and represent the average of two replicates for each dosage of treatment, and four replicates for the untreated plants.

TABLE 2.—SYSTEMIC CONTROL OF BEAN RUST

| Concentration (mg./plant) | Average Number of Lesions per Leaf | | Average Control, Percent |
|---|---|---|---|
| | Leaf 1 | Leaf 2 | |
| 15.0 | 62 | 69 | 59 |
| 7.5 | 74 | 75 | 52 |
| Untreated | 170 | 144 | 0 |

Systemic fungicidal activity of the order shown in Table 2 represents a significant and extremely useful degree of control of the beam rust pathogen, obtained at relatively very low concentrations of active agent applied to the soil.

Example 4.—Systemic control of tobacco wild fire disease

Suspensions of methyl 3-methyl-4-isothiazolecarboxylate containing 1200 p.p.m. of toxicant were prepared as in Example 2, and poured onto the soil of individually-potted tobacco plants at the twelve-leaf stage of growth, in an amount equivalent to 42.0 mg. of the isothiazole per plant. After three days, the foliage was inoculated with the pathogen Pseudomonas tabaci, the causative agent of wild fire disease on tobacco. The inoculated plants were maintained in a humidity chamber at 18° C. for forty-eight hours and then transferred to the greenhouse. Assessment of the degree of control was made seven to ten days after inoculation. The results in Table 3 represent the totals and averages of two replicates, for the treated plants and for the untreated checks.

TABLE 3.—SYSTEMIC CONTROL OF WILD FIRE DISEASE

| Concentration (mg./plant) | Total Number of Lesions | Average Number of Lesions per Leaf | Average Control, Percent |
|---|---|---|---|
| 42.0 | 84 | 3.5 | 60 |
| Untreated | 209 | 8.7 | 0 |

Example 5.—Systemic activity by top dressing of soil

A 5% granular formulation of methyl 3-methyl-4-isothiazolecarboxylate was prepared by blending 5.05% by weight of the isothiazole in 7.58% heavy aromatic naphthas with 87.37% granular Attaclay. The granules were applied to the surface of soil containing tomato plants at rates of 7.0, 52.5, 35.0, 17.5, and 8.75 mg. of active ingredient per plant. Four replicates were employed at each concentration. Four days after treatment, the foliage of the plants was inoculated with the tomato bacterial spot pathogen. The treated plants and controls were maintained in the greenhouse for approximately seven days, after which time the effectiveness of the treatment was assessed in terms of percent control of the disease with respect to the untreated plants. Results shown in Table 4 represent the average of four replicates.

TABLE 4.—SYSTEMIC ACTIVITY BY TOP DRESSING OF SOIL

| Concentration mg./plant): | Average control of Bacterial spot, percent |
|---|---|
| 70.0 | 89 |
| 52.5 | 82 |
| 35.0 | 88 |
| 17.5 | 82 |
| 8.75 | 85 |
| Untreated | 0 |

Effective results are, of course, also obtained by incorporation of the active ingredient into the soil, as well as by the top dressing technique illustrated above.

Example 6.—Systemic activity by seed treatment

Fifty percent by weight of methyl 3-methyl-4-isothiazolecarboxylate in 5.0% "Marcol 90," an aliphatic liquid petroleum distillate, was blended with 45.0% talc. Bonnie Best tomato plant seeds were coated by shaking with this formulation at a rate of 2.0 lb. of active ingredient per 100 lb. of seed. One day after coating, the seeds were planted. Twenty-six days later the foliage was inoculated with the tomato bacterial spot pathogen. The plants were maintained in the greenhouse for eight days, after which time the plants grown from treated seed were compared with untreated checks. The average number of lesions per leaf, from eight replicates, was 60 for the treated plants and 109 for the untreated plants, representing 45% control of bacterial spot by this seed treatment.

Example 7.—Contact fungicidal activity of methyl 3-methyl-4-isothiazolecarboxylate The contact fungicidal activity of methyl 3-methyl-4-isothiazolecarboxylate was demonstrated, using a modification of the cylinder-cup technique used to assay antibiotics, as follows:

Individual batches of molten malt agar were seeded with spores of *Aspergillus niger, Pullularia pullulans, Penicillium expansum,* and *Alternaria solani.* The seeded agar was poured into a test plate and allowed to harden. A plastic or glass ring, 10–12 mm. in diameter, was placed in the center of the seeded plate and approximately 0.25 g. of methyl 3-methyl-4-isothiazolecarboxylate was placed in the ring. The plates were incubated for 72 hours at 28°. The distance (in millimeters) between the nearest growth and the ring was recorded as the zone of inhibition. The results are presented in Table 5.

TABLE 5.—CONTACT FUNGICIDAL ACTIVITY

| Organism: | Zone of inhibition, mm. |
|---|---|
| A. niger | 4 |
| P. pullulans | 8 |
| P. expansum | 4 |
| A. solani | (¹) |

¹ Complete inhibition.

Example 8.—Synthesis and systemic activity of ethyl 3-methyl-4-isothiazolecarboxylate Ethyl 3-methyl-4-isothiazolecarboxylate was prepared from 3-methyl-4-isothiazolecarbonyl chloride, which was in turn prepared from the corresponding methyl ester, as follows: a suspension of 68 g. of methyl 3-methyl-4-isothiazolecarboxylate in 600 ml. of 2 N sodium hydroxide was stirred at room temperature for two days. The clear aqueous phase was extracted three times with an equal volume of ether, then cooled in an ice bath and acidified with concentrated hydrochloric acid. The precipitate was isolated by filtration and dried in vacuo over phosphorus pentoxide, to yield 42.5 g. of 3-methyl-4-isothiazolecarboxylic acid, M.P. 219–222°. By recrystallization from ethanol, the melting point was raised to 230–232°.

A mixture of 82.5 g. of 3-methyl-4-isothiazolecarboxylic acid and 270 g. of thionyl chloride was warmed under reflux for three hours. The excess thionyl chloride was removed at normal pressure and the crude acid chloride distilled under reduced pressure to yield 87 g. of 3-methyl-4-isothiazolecarbonyl chloride, B.P. 95–96°/12 mm.

To an ice-cold solution of 15.0 g. of 3-methyl-4-isothiazolecarbonyl chloride in 75 ml. of dichloromethane and 9.4 g. of triethylamine, 4.3 g. of absolute ethanol was added dropwise. After one-half hour the ice bath was removed and the reaction mixture allowed to stand for twelve hours. The dichloromethane solution was then washed with water, with 5% sodium bicarbonate solution, and with saturated sodium chloride solution. After drying, the solvent was removed under reduced pressure and the residue subjected to a vacuum distillation, B.P. 107–108°/11 mm. Spectral data indicated that a mixture of ester and acid chloride was present. The esterification was therefore repeated with an added amount of ethanol and triethylamine. After similar workup there was obtained 14.3 g. of pure ethyl 3-methyl-4-isothiazolecarboxylate, B.P. 91.5–93°/3 mm., $n_D^{24.5}=1.5139$. Nuclear magnetic resonance and infrared spectra are in agreement with this structure.

*Analysis.*—Calc'd for $C_7H_9O_2NS$: C, 49.12; H, 5.30. Found: C, 49.18; H, 5.26.

Following the procedure of Example 2, the systemic activity of ethyl 3-methyl-4-isothiazolecarboxylate was evaluated against bacterial spot of tomato, employing dosages equivalent to 21.0, 10.5, and 5.25 mg. of the isothiazole per Bonnie Best tomato plant. Results are shown in Table 6.

TABLE 6.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 12 | 79 | 20 | 83 |
| 10.5 | 15 | 34 | 59 | 84 |
| 5.25 | 50 | 79 | 25 | 77 |
| Untreated | | 222 | | 0 |

Example 9.—Synthesis and systemic activity of S-ethyl 3-methyl-4-isothiazolecarboxythiolate To an ice-cold solution of 9.3 g. of ethanethiol and 15.2 g. of triethylamine in 100 ml. of dichloromethane was added 20.0 g. of 3-methyl-4-isothiazolecarbonyl chloride dissolved in 25 ml. of dichloromethane. After completion of the addition, the mixture was kept at room temperature for fourteen hours. The organic phase was washed with dilute hydrochloric acid and dried over anhydrous calcium chloride. The solvent was removed in vacuo and the residue distillated under reduced pressure, to yield 16.5 g. of S-ethyl 3-methyl-4-isothiazolecarboxythiolate, B.P. 77°/0.1 mm., M.P. 35–37°. The nuclear magnetic resonance spectrum of a chloroform solution showed peaks at 9.28 p.p.m., 3.06 p.p.m.

(quadruplet); 2.70 p.p.m. (triplet), and 135 p.p.m. downfield from tetramethylsilane as internal standard, which is in agreement with the above structure.

*Analysis.*—Calc'd for $C_7H_9OS_2N$: C, 44.92; H, 4.85. Found: C, 45.26; H, 4.92.

Systemic activity was evaluated, following the procedure of Example 2, employing dosages equivalent to 21.0, 10.5, and 5.25 mg. of S-ethyl 3-methyl-4-isothiazolecarboxythiolate per tomato plant. Results are shown in Table 7.

TABLE 7.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 4 | 3 | 18 | 74 |
| 10.5 | 18 | 13 | 4 | 65 |
| 5.25 | 37 | 11 | 28 | 26 |
| Untreated | | 34 | | 0 |

Example 10.—Synthesis and biological activity of 3-methyl-5-isothiazolecarboxylic acid A solution of 15 g. of 3-methylisothiazole in 200 ml. of dry tetrahydrofuran was cooled by application of a solid carbon dioxide-acetone bath. The temperature of the solution was further reduced to —78° by replacing the carbon dioxide-acetone bath with a liquid nitrogen bath. To the cold solution was added during ten minutes, 160 ml. of a 15% solution of butyllithium in hexane, addition being as rapid as possible without the temperature rising above —70°. The mixture was stirred at —78° for ten minutes and poured into a slurry of solid carbon dioxide in dry ethyl ether. The ether slurry was allowed to warm to room temperature, then treated with dilute hydrochloric acid. The water layer was extracted twice with ethyl ether and the combined ether solutions were extracted three times with 2 N sodium hydroxide solution. The basic solution was acidified and the precipitate dissolved in ether. The ether solution was added to 150 ml. of water and the mixture distilled. All the ether and approximately one third of the water was distilled to remove valeric acid. When the residue was cool, 17.7 g. of crude product was isolated by filtration. Recrystallization from boiling water gave 17.0 g. of product which melted at 202-203°.

When tested according to the procedure of Example 2, 3-methyl-5-isothiazolecarboxylic acid gave control of bacterial spot of 97, 97, and 91% at 21.0, 10.5, and 5.3 mg./plant respectively. When tested against *Uromyces phaseoli* according to the procedure of Example 3, this acid materially retarded development of the spores and ultimately gave an 80% reduction in the disease infection.

Example 11.—Synthesis and biological activity of methyl 3-methyl-5-isothiazolecarboxylate A solution of diazomethane in ether was prepared from "Diazald" (N-methyl-N-nitroso - p - toluenesulfonamide) and methanolic potassium hydroxide. The solution was added dropwise to a cold solution of 8.0 g. and 3-methyl-5-isothiazolecarboxylic acid in 150 ml. of methanol while the temperature of the solution was maintained at 0°. Addition was continued until the yellow color persisted for two minutes. When the addition was complete, the mixture was allowed to warm to room temperature and the excess diazomethane and solvents were removed by distillation. The residue was distilled to give 7.5 g. of methyl 3-methyl-5-isothiazolecarboxylate which distilled at 100-101°/15 mm.; M.P. 30-31°.

*Analysis.*—Calc'd for $C_6H_7NO_2S$: C, 45.90; H, 4.46. Found: C, 45.90; H, 4.35.

When tested against bacterial spot of tomato according to the procedure of Example 2, methyl 3-methyl-5-isothiazole-carboxylate gave excellent control at all levels. Further tests at lower rates confirmed the high activity of the compound. Results of two such tests are summarized in Table 8 (in this and subsequent tests, data from different tests appear in different columns).

TABLE 8.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 4 | 2 | 2 | 99 |
| 10.5 | 7 | 15 | 2 | 98 |
| 5.3 | 2 | 7 | 3 | 99 |
| 2.6 | 0 | 19 | 7 | 98 |
| 1.3 | 1 | 13 | 13 | 98 |
| 0.65 | 6 | 23 | 33 | 95 |
| 0.33 | 127 | 41 | 31 | 91 |
| 0.16 | 323 | 213 | 160 | 70 |
| Untreated | 413 | 776 | | 0 |

Tests with methyl 3-methyl-5-isothiazolecarboxylate granules using the procedure of Example 5, further demonstrated the effectiveness of this compound as a systemic bactericide. These results are summarized in Table 9.

TABLE 9.—SYSTEMIC ACTIVITY BY TOP DRESSING OF SOIL

Concentration (mg./plant): Average control of Bacterial spot, percent
42.0 _____ 100
21.0 _____ 100
10.5 _____ 100
5.3 _____ 99
2.6 _____ 89
1.3 _____ 79
0.65 _____ 46
Untreated _____ 0

Example 12.—Synthesis and systemic activity of S-ethyl 3-methyl-5-isothiazolecarboxythiolate S-ethyl 3-methyl-5-isothiazolecarboxythiolate was prepared from 3-methyl-5-isothiazolecarboxylic acid via the acid chloride as follows: a mixture of 20 g. 3-methyl-5-isothiazolecarboxylic acid and 40 ml. of thionyl chloride was heated under gentle reflux for three hours. The excess thionyl chloride was removed by distillation and the product distilled under water aspirator vacuum to give 21 g. 3-methyl-5-isothiazolecarbonyl chloride, B.P. 86-87°/15 mm.

*Analysis.*—Calc'd for $C_5H_4ClNOS$: C, 37.10; H, 2.48. Found: C, 37.17; H, 2.27.

A stirred solutioin of 4.5 g. of ethanethiol and 7.3 g. of triethylamine in 75 ml. of dichloromethane was cooled to 0° and a solution of 9.0 g. of 3-methyl-5-isothiazolecarbonyl chloride was added dropwise. The mixture was stirred without further cooling for three hours, then washed with 1 N hydrochloric acid, dried and distilled to yield 8.0 g. of S-ethyl 3-methyl-5-isothiazolecarboxythiolate, B.P. 83-85°/0.03 mm.

*Analysis.*—Calc'd for $C_7H_9NOS_2$: C, 45.00; H, 4.82. Found: C, 45.08; H, 4.94.

When tested against bacterial spot of tomato according to the procedure of Example 2, S-ethyl 3-methyl-5-isothiazolecarboxythiolate gave excellent control even at low rates as shown in Table 10.

TABLE 10.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 8 | 6 | 23 | 97 |
| 10.5 | 10 | 8 | 7 | 98 |
| 5.3 | 32 | 10 | 2 | 96 |
| 2.6 | 4 | 7 | 3 | 99 |
| 1.3 | 9 | 27 | 12 | 96 |
| 0.65 | 80 | 21 | 66 | 86 |
| Untreated | | 413 | | 0 |

Example 13.—Synthesis and systemic activity of ethyl 3-methyl-5-isothiazolecarboxylate A solution of 10.0 g. of 3-methyl-5-isothiazolecarbonyl chloride in 25 ml. of dichloromethane was added dropwise at room temperature to a stirred solution of 7.9 g. of ethanol and 7.6 g. of triethylamine in 50 ml. of dichloromethane. The mixture was allowed to stand at room temperature for approximately 72 hours, then washed with 5% hydrochloric acid and with water. The washed solution was dried over sodium sulfate and distilled to give 8.6 g. of ethyl 3-methyl-5-isothiazolecarboxylate, B.P. 48–50°/0.15 mm.

*Analysis.*—Calc'd for $C_7H_9NO_2S$: C, 49.11; H, 5.30; N, 8.18. Found: C, 49.34; H, 5.41; N, 7.92.

When tested against bacterial spot of tomato according to the procedure of Example 2, ethyl 3-methyl-5-isothiazolecarboxylate gave excellent control. Further tests at lower rates confirmed the high activity of the compound. Table 11 summarizes results of two such tests.

TABLE 11.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 4 | 3 | 3 | 98 |
| 10.5 | 1 | 2 | 4 | 98 |
| 5.3 | 5 | 4 | 0 | 98 |
| 2.6 | 3 | 3 | 10 | 93 |
| 1.3 | 5 | 12 | 13 | 87 |
| 0.65 | 29 | 13 | 29 | 71 |
| 0.33 | 39 | 38 | 44 | 52 |
| 0.16 | 35 | 48 | 65 | 40 |
| Untreated | 132 | 84 | | 0 |

Example 14.—Synthesis and systemic activity of propyl 3-methyl-5-isothiazolecarboxylate Ten ml. of 1-propanol was reacted with 10.0 g. of 3-methyl-5-isothiazolecarbonyl chloride using the procedure of Example 13 to give 9.65 g. of propyl 3-methyl-5-isothiazolecarboxylate, B.P. 60–62°/0.13 mm.

*Analysis.*—Calc'd for $C_8H_{11}NO_2S$: C, 51.82; H, 5.99; N, 7.56. Found: C, 51.95; H, 6.29; N, 7.36.

Excellent control of bacterial spot of tomato was obtained when propyl 3-methyl-5-isothiazolecarboxylate was tested according to the procedure of Example 2, as summarized in Table 12.

TABLE 12.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 6 | 4 | 2 | 98 |
| 10.5 | 4 | 1 | 3 | 98 |
| 5.2 | 3 | 5 | 3 | 98 |
| 2.6 | 2 | 1 | 4 | 98 |
| 1.3 | 13 | 5 | 18 | 86 |
| 0.65 | 16 | 20 | 11 | 82 |
| 0.33 | 58 | 48 | 66 | 32 |
| 0.16 | 62 | 63 | 50 | 31 |
| Untreated | 132 | 84 | | 0 |

Example 15.—Synthesis and systemic activity of 2-propyn-1-yl 3-methyl-5-isothiazolecarboxylate Ten grams of 3-methyl-5-isothiazolecarbonyl chloride was reacted with 4.3 g. of propargyl alcohol using the procedure described in Example 13 except that the product was not distilled. After the solution containing the crude product was dried, the solvent was removed under reduced pressure and the residual solid was recrystallized from hexane to yield 8.5 g. of 2-propyn-1-yl 3-methyl-5-isothiazolecarboxylate, M.P. 72–74°.

*Analysis.*—Calc'd for $C_8H_7NO_2S$: C, 53.02; H, 3.90; N, 7.73. Found: C, 53.03; H, 3.86; N, 7.47.

When tested according to the procedure of Example 2, 2-propyn-1-yl 3-methyl-5-isothiazolecarboxylate provided excellent control of bacterial spot of tomato as shown in Table 13.

TABLE 13.—SYSTEMIC CONTROL OF BACTERIAL SPOT

| Concentration (mg./plant) | Average Number of Lesions per Leaf | | | Average Control, Percent |
|---|---|---|---|---|
| | Leaf 1 | Leaf 2 | Leaf 3 | |
| 21.0 | 1 | 0 | 0 | 99 |
| 10.5 | 0 | 1 | 1 | 99 |
| 5.3 | 4 | 1 | 0 | 98 |
| 2.6 | 12 | 1 | 3 | 94 |
| 1.3 | 4 | 2 | 27 | 87 |
| 0.65 | 25 | 24 | 33 | 68 |
| 0.33 | 24 | 25 | 42 | 64 |
| 0.16 | 50 | 72 | 52 | 31 |
| Untreated | 132 | 84 | | 0 |

Example 16.—Synthesis and systemic activity of S-methyl 3-methyl-5-isothiazolecarboxythiolate To a cold solution (ice bath) of 7.6 g. triethylamine in 50 ml. of dichloromethane was added 7.9 g. of methanethiol. While maintaining the temperature below 10°, a solution of 10.0 g. of 3-methyl-5-isothiazolecarbonyl chloride in 25 ml. of dichloromethane was slowly added. The cooling bath was removed and the mixture was allowed to stand for 20 hours. The solution was washed twice with 1 N hydrochloric acid, dried and distilled to yield 9.0 g. of S-methyl 3-methyl-5-isothiazolecarboxythiolate, B.P. 64–66°/0.04 mm.

*Analysis.*—Calc'd for $C_6H_7NOS_2$: C, 41.59; H, 4.07; N, 8.09. Found: C, 41.78; H, 3.95; N, 7.87.

When tested according to the procedure of Example 2, S-methyl 3-methyl-5-isothiazolecarboxythiolate provided 99, 99, and 100% control of bacterial spot at rates of 21.0, 10.5, and 5.3 mg. per plant respectively.

Example 17.—Synthesis and systemic activity of S-propyl 3-methyl-5-isothiazolecarboxythiolate Propane-1-thiol (5.3 g.) was reacted with 10.0 g. of 3-methyl-5-isothiazolecarbonyl chloride according to the procedure described in Example 16, to give 10.6 g. of S-propyl 3-methyl-5-isothiazolecarboxythiolate which distilled at 78–80°/0.1 mm.

*Analysis.*—Calc'd for $C_8H_{11}NOS_2$: C, 47.75; H, 5.51; N, 6.96. Found: C, 48.02; H, 5.53; N, 7.05.

In tests according to the procedure of Example 2, S-propyl 3-methyl - 5 - isothiazolecarboxythiolate provided complete control of bacterial spot of tomato at 21.0 and 10.5 mg. per plant and 99% control at 5.3 mg. per plant.

Example 18.—Synthesis and systemic activity of triethylammonium 3-methyl-5-isothiazolecarboxylate A mixture of 5.0 g. of 3-methyl-5-isothiazolecarboxylic acid and 3.5 g. of triethylamine was dissolved in 2.5 g. of water. The brown solution was used for tests according to Example 2 without further purification or formulation. Control of bacterial spot of tomato at 21.0, 10.5, and 5.3 mg. per plant was 99, 98, and 99%, respectively.

Example 19.—Synthesis and systemic activity of 4-methyl-5-isothiazolecarboxylic acid A solution of 7.5 g. of 4-methylisothiazole in 130 ml. of dry tetrahydrofuran was cooled in a solid $CO_2$-acetone bath. The $CO_2$-acetone bath was replaced by a liquid nitrogen bath and the temperature of the solution reduced to −78°. To the cold solution was slowly added, during forty-five minutes, a solution of 7.2 g. of butyllithium in 78 ml. hexane. The rate of addition was regulated so that the temperature of the reaction mixture did not exceed −75°. The mixture was poured immediately into a solid $CO_2$-slurry. The slurry was stirred while warmed slowly to 0°. Dilute (1 N) hydrochloric acid was added, the layers separated and the water layer extracted with ether. The organic extracts were combined and extracted with three volumes of 2 N sodium hydroxide solution. The alkaline water solutions were acidified, the precipitated acid taken up in ether, and the ether solution added to a flask containing 150 ml. of water. The ether, and approximately 50 ml. of water, was distilled to remove valeric acid. The residual water solution was cooled, and the solid isolated by filtration to give 6 g. of 4-methylisothiazole-5-carboxylic acid, M.P. 177–179°.

Analysis.—Calc'd for $C_5H_5NO_2S$: C, 42.10; H, 3.50. Found: C, 41.78; H, 3.50.

When tested according to the method of Example 2, 4-methyl-5-isothiazolecarboxylic acid gave 95, 95, and 92% control of bacterial spot of tomato at 21.0, 10.5 and 5.3 mg. per plant, respectively.

Example 20.—Synthesis and systemic activity of ethyl 4-methyl-5-isothiazolecarboxylate Ethyl 4-methyl-5-isothiazolecarboxylate was prepared from 4-methyl-5-isothiazolecarboxylic acid via the acid chloride as follows:

A mixture of 88 g. 4-methyl-5-isothiazolecarboxylic acid and 118 g. of thionyl chloride in 50 ml. of benzene was heated at approximately 80° for 18 hours. An additional 82 g. of thionyl chloride was added and the mixture heated under reflux for three hours. The excess thionyl chloride and benzene were removed by distillation and the residue distilled under reduced pressure. Redistillation gave 59.2 g. of 4-methyl-5-isothiazolecarbonyl chloride which distilled at 90–93°/25 mm.

To a stirred solution of 7.9 g. of ethanol and 7.6 g. of triethylamine in 50 ml. of dichloromethane was added slowly at room temperature a solution of 10.0 g. of 4-methyl-5-isothiazolecarbonyl chloride in 25 ml. of dichloromethane. The mixture was allowed to stand for twenty hours, then washed twice with 1 N hydrochloric acid and with water. The washed solution was dried and distilled to yield 8.0 g. of ethyl 4-methyl-5-isothiazolecarboxylate, B.P. 113–115°/21 mm.

Analysis.—Calc'd for $C_7H_9NO_2S$: C, 49.11; H, 5.30; N, 8.18. Found: C, 49.38; H, 5.38; N, 8.45.

Evaluation according to the procedure of Example 2, of ethyl 4-methyl-5-isothiazolecarboxylate against bacterial spot of tomato at 21.0, 10.5, and 5.3 mg. per plant indicated control of 98, 97, and 95%, respectively.

Example 21.—Synthesis and systemic activity of propyl 4-methyl-5-isothiazolecarboxylate A stirred solution of 9.3 g. of 1-propanol and 10.8 g. of triethylamine in 75 ml. of dichloromethane was cooled in an ice bath while a solution of 12.0 g. of 4-methyl-5-isothiazolecarbonyl chloride in 25 ml. dichloromethane was added dropwise. The ice bath was removed and the reaction mixture allowed to stand for twenty minutes at room temperature. The reaction mixture was washed with 1 N hydrochloric acid, then the volatile materials were removed under reduced pressure and the product distilled. Redistillation gave 10.3 g. of propyl 4-methyl-5-isothiazolecarboxylate which boiled at 55–59°/ca. 0.75 mm.

Analysis.—Calc'd for $C_8H_{11}NO_2S$: C, 51.87; H, 5.99; N, 7.56. Found: C, 51.96; H, 5.93; N, 7.81.

In tests carried out according to the procedure of Example 2, propyl 4-methyl-5-isothiazolecarboxylate gave 95, 93, and 85% control of bacterial spot of tomato at 21.0, 10.5 and 5.3 mg. per plant, respectively.

Example 22.—Synthesis and systemic activity of S-methyl 4-methyl-5-isothiazolecarboxythiolate A solution of 7.9 g. of methanethiol and 7.6 g. of triethylamine in 50 ml. of dichloromethane was cooled to approximately 0° and to it was slowly added a solution of 10.0 g. of 4-methyl-5-isothiazolecarbonyl chloride in 25 ml. of dichloromethane. The ice bath was removed and the mixture allowed to stand at room temperature for twenty hours. It was then washed twice with 1 N hydrochloric acid, dried and the dried solution distilled to give 7.7 g. of S-methyl 4-methyl-5-isothiazolecarboxythiolate, B.P. 72–74°/0.02 mm.

Analysis.—Calc'd for $C_6H_7NOS_2$: C, 41.59; H, 4.07; N, 8.09. Found: C, 41.83; H, 3.99; N, 7.93.

In evaluations carried out according to the procedure of Example 2, S-methyl 4-methyl-5-isothiazolecarboxythiolate gave 99, 98, and 99% control of bacterial spot of tomato at 21.0, 10.5, and 5.3 mg. per plant, respectively.

Example 23.—Synthesis and systemic activity of S-propyl 4-methyl-5-isothiazolecarboxythiolate By the procedure of Example 22, 5.3 g. of 1-propanethiol was reacted with 10.0 g. of 4-methyl-5-isothiazolecarbonyl chloride to give 8.2 g. of S-propyl 4-methyl-5-isothiazolecarboxythiolate, B.P. 80–84°/0.07 mm.

Analysis.—Calc'd for $C_8H_{11}NOS_2$: C, 47.75; H, 5.51; N, 6.96. Found: C, 47.88; H, 5.54; N, 7.21.

When tested according to the procedure of Example 2, S - propyl 4 - methyl - 5 - isothiazolecarboxythiolate provided 99, 98, and 97% control of bacterial spot of tomato at 21.0, 10.5, and 5.3 mg. per plant, respectively.

Example 24.—Synthesis and systemic activity of methyl 5-isothiazolecarboxylate 5-isothiazolecarboxylic acid (8.0 g.) was esterified by reaction with diazomethane according to the procedure of Example 11, to give 6.0 g. of methyl - 5 - isothiazolecarboxylate, B.P. 88°/15 mm.; M.P. 40–42°.

Analysis.—Calc'd for $C_5H_5NO_2S$: C, 42.0; H, 3.5. Found: C, 41.9; H, 3.5.

Control of bacterial spot of tomato in tests carried out according to the procedure of Example 2 was 95, 86, and 87% at 21.0, 10.5, and 5.3 mg. per plant, respectively.

Example 25.—Synthesis and systematic activity of 2-propyn-1-yl 3-methyl-4-isothiazolecarboxylate A mixture of 3.5 g. propargyl alcohol and 15.0 g. of triethylamine in 150 ml. of dichloromethane was cooled in an ice bath while vigorously being stirred. To this cold solution was added dropwise 10.0 g. of 3-methyl-4-isothiazolecarbonyl chloride. The solution obtained was washed with water, 1 N sodium bicarbonate, 5% sodium chloride and 1 N hydrochloric acid. The washed solution was dried and distilled under reduced pressure. The distillate crystallized to yield 7.1 g. of 2 - propyn - 1 - yl 3 - methyl - 4 - isothiazolecarboxylate, M.P. 43–45°.

Analysis.—Calc'd for $C_8H_7NO_2S$: C, 53.04; H, 3.90. Found: C, 53.34; H. 3.95.

Testing of 2 - propyn - 1 - yl 3 - methyl - 4 - isothiazolecarboxylate according to the procedure of Example 2, resulted in control of bacterial spot of tomato of 86, 87, and 94% at 21.0, 10.5, and 5.3 mg. per plant, respectively.

Example 26.—Preparation of 2-butynylene bis(3-methyl-4-isothiazolecarboxylate)

Reaction of 5.3 g. of 2 - butyn - 1,4 - diol and 10.0 g. of 3 - methyl - 4 - isothiazolecarbonyl chloride according to the procedure of Example 25, gave a solution of product which upon evaporation gave a crude solid. Recrystallization from dichloromethane gave 5.5 g. of 2 - butynylene bis(3 - methyl - 4 - isothiazolecarboxylate), M.P. 114–115°.

Analysis.—Calc'd for $C_{14}H_{12}N_2O_4S_2$: C, 50.00; H, 3.60. Found: C, 49.49; H, 3.88.

When tested according to the method of Example 2, 2 - butynylene bis(3 - methyl - 4 - isothiazolecarboxylate) gave 92, 92, and 94% control of bacterial spot of tomato at 21.0, 10.5, and 5.3 mg. per plant respectively.

Example 27.—Synthesis and systemic activity of 1-nitro-2-propyl-3-methyl-4-isothiazolecarboxylate 1-nitro-2-propyl - 3 - methyl - 4 - isothiazolecarboxylate was prepared by esterification of 1 - nitro - 2 - propanol using 3 - methyl - 4 - isothiazolecarboxylic anhydride which is obtained as follows:

A mixture of 40.0 g. of 3 - methyl - 4 - isothiazolecarboxylic acid and 310 ml. of acetic anhydride was heated under reflux for fifteen hours. The reaction mixture was allowed to cool to room temperature and a small quantity of white solid removed by filtration. The unreacted acetic anhydride and acetic acid was removed by distillation at 30 mm. The residue solidified on cooling. The solid residue was dissolved in 300 ml. of toluene and the solution poured into 375 ml. hexane. The resulting solution was treated with activated charcoal and to the clarified solution was added 200 ml. pentane. The mixture was cooled to permit complete separation of the crystalline solid. The solid was isolated by filtration to yield 11.6 g. of the desired 3 - methyl - 4 - isothiazolecarboxylic acid anhydride, M.P. 129–130°.

To 4.8 g. of 1 - nitro - 2 - propanol containing one drop of concentrated sulfuric acid was added in small portions 11.6 g. of 3 - methyl - 4 - isothiazolecarboxylic anhydride. The mixture solidified when approximately one third of the anhydride had been added. The mixture was heated at 60° for four hours. Three volumes of benzene were added and the suspended solid isolated by filtration and identified as 3 - methyl - 4 - isothiazolecarboxylic acid. The benzene solution was distilled and, after removal of the low boiling materials, gave 5.9 g. of 1-nitro-2-propyl 3 - methyl - 4 - isothiazolecarboxylate, B.P. 125°/10$^{-5}$ mm.

*Analysis.*—Calc'd for $C_8H_{10}N_2O_4S$: C, 41.73; H, 4.38; N. 12.17. Found: C, 42.20; H, 4.34; N, 11.24.

When tested according to the procedure of Example 2, 1 - nitro - 2 - propyl 3 - methyl - 4 - isothiazolecarboxylate gave 97, 98, and 96% control of bacterial spot of tomato at 21.0, 10.5, and 5.3 mg. per plant respectively.

Example 28.—Synthesis and systemic activity of methyl 5-methyl-4-isothiazolecarboxylate A solution of 9.0 g. of 4 - isothiazolecarboxylic acid in 250 ml. of dry tetrahydrofuran was cooled to —75° using a liquid nitrogen bath. A solution of butyllithium in hexane (120 ml. containing 15% butyllithium) was added dropwise during thirty minutes. The temeprature of the mixture was kept below —70° throughout the addition. When addition was complete, the reaction mixture was allowed to warm slightly, but kept between —65° and —70° for fifteen minutes. The mixture was cooled again to —75° and treated with 28 g. of dimethyl sulfate, again maintaining the temperature below —70° throughout the addition. When the addition of dimethyl sulfate was completed, the mixture was allowed to warm slowly to room temperature. The solution was extracted three times with 50 ml. portions of 2 N sodium hydroxide. The water extracts were combined and acidified by addition of concentrated sulfuric acid. The water solution was extracted continuously with ethyl ether for twenty four hours. The ether extract was dried and distilled to yield 5.5 g. of yellow solid which was used without further purification.

A solution of 15 g. of 5 - methylisothiazole - 4 - carboxylic acid in 200 ml. of methanol was treated with diazomethane in ether at 0°. The ether and methanol were removed by distillation and the residue distilled under aspirator pressure to give 8.5 g. of methyl 5-methyl - 4 - isothiazole - carboxylate, B.P. 100°/15 mm.; M.P. 42–45°.

*Analysis.*—Calc'd for $C_6H_7NO_2S$, C, 45.90; H, 4.46. Found: C, 45.82; H. 4.74.

In tests carried out according to the procedure of Example 2, methyl 5-methyl-4-isothiazolecarboxylate gave 88, 87, and 77% control of bacterial spot of tomato at 21.0, 10.5, and 5.3 mg. per plant, respectively.

Example 29.—Synthesis and systemic properties of 3-hydroxymethyl-4-isothiazolecarboxylic acid To a solution of 100 g. of methyl 3-methyl-4-isothiazolecarboxylate in 1 liter carbon tetrachloride was added 114 g. of N-bromosuccinimide. The suspension was warmed under reflux and stirred. The stirred mixture was irradiated with a sunlamp for two and one half hours. At the end of this time no more N-bromo-succinimide was visible. The slurry was cooled and filtered. The precipitate was washed with 250 ml. of ice-cold carbon tetrachloride and the filtrates were combined and concentrated under reduced pressure. The residue was recrystallized from ethyl ether to give 72.6 g.of methyl 3-bromomethyl-4-isothiazolecarboxylate, M.P. 80–82°. The ether solution from which the monobromo compound crystallized contains a mixture of approximately equal portions of methyl 3-methyl-4-isothiazolecarboxylate and methyl 3-dibromomethyl-4-isothiazolecarboxylate.

*Analysis.*—Calc'd for $C_6H_6BrNO_2S$: C, 32.52; H, 2.56; S, 13.58; Br, 33.85. Found: C, 30.77; H, 2.76; S, 13.73; Br, 34.11.

A mixture of 25.6 g. of methyl 3-bromomethyl-4-isothiazolecarboxylate and 250 ml. of 2 N sodium hydroxide was heated under reflux for six hours. The solution was cooled to room temperature and acidified by addition of 20 ml. of concentrated hydrochloric acid. The acidified solution was allowed to stand while solid crystallized. The crystalline solid was isolated by filtration and dried at 100° under vacuum and sublimed at 160° C., to yield 10.0 g. of 3-hydroxymethyl-4-isothiazolecarboxylic acid, M.P. 197–202°.

*Analysis.*—Calc'd for $C_5H_5NO_3S$: C, 37.74; H, 3.17. Found: C, 38.30; H, 3.51.

Example 30.—Synthesis and systemic activity of methyl 3-hydroxymethyl-4-isothiazolecarboxylate A solution of 340 mg. of 3-hydroxymethyl-4-isothiazolecarboxylic acid in 20 ml. of methanol was treated with diazomethane according to the procedure of Example 11. This solution was dissolved in an equal volume of ether and carbon tetrachloride and the solution washed with 5% sodium carbonate solution, saturated sodium chloride solution, and 5% sodium sulfate solution. Removal of the solvents by distillation and recrystallization of the residue from carbon tetrachloride gave 270 mg. of methyl 3-hydroxymethyl-4-isothiazolecarboxylate, M.P. 77–78°.

*Analysis.*—Calc'd for $C_6H_7NO_3$: C, 41.62; H, 4.08. Found: C, 42.62; H, 4.56.

When tested according to the procedure of Example 2, methyl 3 - hydroxymethyl - 4-isothiazolecarboxylate provided 97% control of bacterial spot at 21.0 mg. per plant.

Example 31.—Synthesis and systemic activity of S-methyl 3-methyl-4-isothiazolecarboxythiolate Reaction of 8.5 g. of mathanethiol and 15.0 g. of 3-methyl-4-isothiazolecarbonyl chloride according to the procedure of Example 16, gave 5.0 g. of S-methyl 3-methyl-4-isothiazolecarboxythiolate, B.P. 70°/0.1 mm.; M.P. 61–63°.

*Analysis.*—Calc'd for $C_6H_7NOS_2$: C, 41.60; H, 4.05. Found: C, 42.01; H, 4.21.

When tested according to the procedure of Example 2, S-methyl 3-methyl-4-isothiazolecarboxythiolate provided 96, 83, and 67% control of bacterial spot at rates of 21.0, 10.5 and 5.3 mg. per plant, respectively.

Example 32.—Synthesis and systemic activity of methyl 3-formyl-4-isothiazolecarboxylate Methyl 3-formyl-4-isothiazolecarboxylate was prepared by hydrolysis of methyl 3-(dibromomethyl)-4-isothiazolecarboxylate, obtained as follows:

To a stirred solution of 43.9 g. of methyl 3-methyl-4-

3,403,209

15 isothiazolecarboxylate in 450 ml. of carbon tetrachloride was added 100 g. of N-bromosuccinimide. The mixture was warmed to the reflux temperature and irradiated with a sunlamp for thirty-one hours while under gentle reflux. The brown solution was cooled to 4° and the succinimide removed by filtration. The filtrate was concentrated by distillation of the carbon tetrachloride and the residue subjected to distillation at 1 mm. The first fraction of 77.6 g. contained 38.5% methyl 3-(bromomethyl)-4-isothiazolecarboxylate and 61.5% methyl 3-(dibromomethyl) compound in a ratio of approximately 4 to 3. The second fraction of 33.4 g. was shown by nuclear magnetic resonance to contain methyl 3-(dibromomethyl)-4-isothiazolecarboxylate. Recrystallization from a minimum of boiling ethyl ether gave 42.8 g. of pure methyl 3 - (dibromomethyl) - 4 - isothiazolecarboxylate; M.P. 61–62°.

*Analysis.*—Calc'd for $C_6H_5Br_2NO_2S$: C, 22.87; H, 1.61; S, 10.19; Br, 50.72. Found: C, 23.08; H, 1.85; S, 10.04; Br, 50.37.

To a warm solution of 3.2 g. of methyl 3-(dibromomethyl)-4-isothiazolecarboxylate in 25 ml. of methanol was added a solution of 4.6 g. of silver nitrate in 6.0 ml. warm water. The mixture was heated under reflux for five minutes. A yellow precipitate appeared immediately. The solution was cooled and the excess silver ion was precipitated by addition of 5% sodium chloride solution. The precipitated silver salt was removed by filtration and the solid washed with water and with chloroform. The aqueous filtrates were combined and extracted with an equal volume of chloroform. The combined chloroform extracts were washed with saturated sodium chloride solution and the washed chloroform solution dried over sodium sulfate. The solvent was removed and the residue of 1.14 g. collected, M.P. 92–96°. Recrystallization from ether-petroleum ether followed by sublimation at 80° under 0.5 mm. raised the melting point of the methyl 3-formyl-4-isothiazolecarboxylate to 98–99°.

*Analysis.*—Calc'd for $C_6H_5NO_3S$: C, 42.11; H, 2.95; N, 8.19. Found: C, 42.39; H, 3.21; N, 7.83.

When tested according to the procedure of Example 2, methyl 3-formyl-4-isothiazolecarboxylate gave 77% control of bacterial spot of tomato at 21.0 mg. per plant.

Example 33.—Synthesis and systemic activity of methyl 3-[(hydroxyimino)methyl]-4-isothiazolecarboxylate A mixture of 800 mg. of methyl 3-formyl-4-isothiazolecarboxylate, 1.0 g. of hydroxylamine hydrochloride and 5 ml. of pyridine in 10 ml. of methanol was heated under reflux for three hours. The solvent was removed under reduced pressure and the residue triturated with a mixture of 5 ml. of chloroform and 5 ml. 1 N hydrochloric acid. The chloroform layer was washed with 5 ml. of 2 N hydrochloric acid and with 5 ml. of saturated sodium chloride solution, then dried. The solvent was removed and the residue sublimed at 125° under 0.5 mm. to give 200 mg. of methyl 3-[(hydroxyimino)methyl]-4-isothiazolecarboxylate, M.P. 167–169°.

*Analysis.*—Calc'd for $C_6H_6N_2O_3S$: C, 38.72; H, 3.25. Found: C, 39.40; H, 3.42.

Methyl 3 - [(hydroxyimino)methyl] - 4-isothiazolecarboxylate, when tested according to the procedure of Example 2, provided 98, 91, and 96% control of bacterial spot of tomato at rates of 21.0, 10.5 and 5.3 mg. per plant, respectively.

Example 34.—Synthesis and systemic activity of methyl-3-(dimethoxymethyl)-4-isothiazolecarboxylate A solution of 20.0 g. methyl 3-(dibromomethyl)-4-isothiazolecarboxylate in 150 ml. of methanol was heated nearly to reflux and to it was added a warm (70°) solution of 29.0 g. silver nitrate in 36 ml. of water. The mixture was heated under reflux for five minutes. A yellow precipitate formed immediately. The suspension was cooled and excess 10% sodium chloride solution was added. The mixture was filtered and the solution concentrated by distillation of the water-methanol azeotrope. The residual aqueous suspension was cooled and extracted with an equal volume of chloroform. The chloroform layers were washed with saturated sodium chloride solution and dried over sodium sulfate. Removal of the solvent left 13.6 g. of a mixture of methyl 3-formyl-4-isothiazolecarboxylate and methyl 3-(dimethoxymethyl)-4-isothiazolecarboxylate. The mixture was dissolved in 100 ml. of methanol and the solution was saturated with dry hydrogen chloride gas. While hydrochloric acid continued to bubble into the mixture, the temperature was increased to the reflux temperature where it was maintained for one hour. The mixture was cooled, then poured into excess ice-cold 2 N sodium hydroxide and the basic aqueous mixture was extracted with an equal volume of chloroform. The chloroform extracts were dried and concentrated to leave a residue which distilled to give 2.7 g. of methyl 3-(dimethoxymethyl)-4-isothiazolecarboxylate, B.P. 119–120°/1.8 mm.

*Analysis.*—Calc'd for $C_8H_{11}NO_4S$: C, 44,24; H, 5.11. Found: C, 43.93; H, 5.21.

When tested according to the procedure of Example 2, methyl 3-(dimethoxymethyl)-4-isothiazolecarboxylate gave 69% control of bacterial spot of tomato at 21.0 mg. per plant.

Example 35.—Synthesis and systemic acivity of phenyl 3-methyl-4-isothiazolecarboxylate A mixture of 10.8 g. of phenol, 11.6 g. of triethylamine and 75 ml. of dichloromethane was cooled in an ice bath. To the cold solution was added 16.0 g. of 3-methyl-4-isothiazolecarbonyl chloride. The mixture was washed with an equal volume of water, dried and the solvent removed by distillation. The residue (22 g.) was washed with 5% sodium hydroxide and 1 N hydrochloric acid and distilled to give 7 g. of phenyl 3-methyl-4-isothiazolecarboxylate, M.P. 74–77°.

*Analysis.*—Calc'd for $C_{11}H_9NO_2S$: C, 60.25; H, 4.10. Found: C, 60.29; H, 4.03.

When tested according to the procedure of Example 2, phenyl 3-methyl-4-isothiazolecarboxylate gave 53% control of bacterial spot of tomato at 21.0 mg. per plant.

Other examples of compounds falling within the generic formulas presented herein, which may be formulated into fungicidal and bactericidal compositions and applied as herein described include:

Propyl 3-methyl-4-isothiazolecarboxylate,
Methyl 4-methyl-5-isothiazolecarboxylate,
2-propyn-1-yl 4-methyl-5-isothiazolecarboxylate,
S-ethyl 4-methyl-5-isothiazolecarboxythiolate,
S-ethyl 3-isothiazolecarboxythiolate,
5-isothiazolecarboxylic acid,
S-ethyl 5-isothiazolecarboxythiolate,
S-propyl 3-methyl-4-isothiazolecarboxythiolate,
3-(acetoxymethyl)-4-isothiazolecarboxylic acid,
Sodium 3-methyl-4-isothiazolecarboxylate.

The isothiazolecarboxylates of this invention form effective systemic compositions when formulated with any of the relatively inert adjuvants and carriers normally employed for facilitating the dispersion of active ingredients for agricultural applications, recognizing the fact that the formulation and mode of application of a toxicant may affect the activity of the material in a given application. Thus, these active fungicidal and bactericidal compounds may be formulated as granules of relatively large particle size, as powdery dusts, as wettable powders, as emulsifiable concentrates, as solutions, or as any of several other known types of formulations, depending on the desired mode of application. These formulations may contain as little as 0.5% to as much as 95% or more by weight of active ingredient.

Dusts are free-flowing admixtures of the active ingredient with finely divided solids such as talc, natural clays, kieselguhr, flours such as walnut shell and cottonseed flours, and other organic and inorganic solids which act as dispersants and carriers for the toxicant; these finely divided solids have an average particle size of less than about 50 microns. A typical dust formulation, useful herein, is one containing 1.0 part of the isothiazole and 99.0 parts of talc.

Wettable powders are also useful formulations, and are in the form of finely divided particles which disperse readily in water or other dispersant. The wettable powder is ultimately applied either as a dry dust or as a suspension in water or other liquid. Typical carriers for wettable powders include fuller's earth, kaolin clays, silicas, and other readily wet organic or inorganic diluents. Wettable powders normally are prepared to contain about 5–95% of active ingredient, depending on the absorbency of the carrier, and usually also contain a small amount of a wetting, dispersing, or emulsifying agent to facilitate wetting or dispersion. For example, a useful wettable powder formulation contains 25.0 parts of the isothiazole, 72.0 parts of Attaclay and 1.5 parts of sodium lignosulfonate and 1.5 parts of sodium alkylnaphthalenesulfonate as wetting agents.

Other useful formulations are the emulsifiable concentrates, which are homogeneous liquid or paste compositions which are dispersable in water or other dispersant, and may consist entirely of the isothiazole with a liquid or solid emulsifying agent, or may also contain a liquid carrier, such as xylene, heavy aromatic naphthas, dimethyl sulfoxide, isophorone, and other non-volatile organic solvents. For application, these concentrates are dispersed in water or other liquid carrier, and normally applied as a spray to the area to be treated. The percentage by weight of the essential active ingredient may vary according to the manner in which the composition is to be applied, but in general comprises 0.5% to 95% of active ingredient by weight of the fungicidal or bactericidal composition.

Granular formulations, wherein the active ingredient is carried on relatively coarse particles, are usually applied to the soil wherein there is growing, or will be planted, the seedlings or plants to be protected. Typical carriers for granular formulations include attapulgite clays, kaolin clays, fuller's earth, sand, vermiculite, perlite, and other organic or inorganic materials which absorb or which may be coated with the active ingredient. Granular formulations normally are prepared to contain about 2–25% of active ingredient and may also contain small amounts of other ingredients such as surface-active agents (wetting agents, dispersing agents, emulsifiers), oils (kerosene, heavy aromatic naphthas, vegetable oils), and stickers (dextrins, glues or synthetic resins). The average particle size of the granules is usually between 150 and 2400 microns. For example, a useful granular formulation contains 10.1 parts by weight of the isothiazolecarboxylate, 15.2 parts of aromatic naphtha (boiling range 350–450° F.) and 74.7 parts of attapulgite clay (24/48 mesh).

Typical wetting, dispersing, or emulsifying agents used in agricultural formulations include, for example, the alkyl and alkylaryl sulfonates and sulfates and their sodium salts; polyhydric alcohols; and other types of surface active agents, many of which are available in commerce. The surface active agent, when used, normally comprises from 1% to 15% by weight of the composition.

Other useful formulations for soil applications include simple solutions of the active ingredient in a dispersant in which it is completely soluble at the desired concentration, such as acetone, alkylated naphthalenes, xylene, or other organic solvents. Pressurized sprays, typically aerosols wherein the active ingredient is dispersed in finely divided form as a result of vaporization of a low-boiling dispersant solvent carrier, such as the Freons, may also be used.

Useful control of plant-infesting bacteria and fungi may be achieved by application of an effective amount and concentration of the active isothiazole to the seeds, to the soil either before planting, at the time of planting, or during growth of the plant, either by incorporation into the soil or application to the soil surface; and to the growing plant itself, either directly to the foliage, or even by injection into the stem or trunk of the plant or tree.

In addition to their systemic and topical activity, these novel bactericidal and fungicidal agents also exhibit excellent residual activity in the soil and in the plant, giving long-lasting protection against plant pathogens.

The active compounds of this invention may be formulated and/or applied with other active agents, such as insecticides, nematocides, plant growth regulators, fertilizers, other fungicides or bactericides, and the like. They also have utility in control of growth of bacteria and fungi in cutting oils, for use in combination with detergents as antiseptic washes, in hide preservation, in wood preserving, and elsewhere where control of pathogenic microorganisms is important.

It is apparent that modifications may be made in the formulation and application of the compositions of this invention, without departing from the novel concept herein, as defined in the following claims.

We claim:

1. Fungicidal and bactericidal composition which comprises an effective amount of an isothiazolecarboxylate of the formula

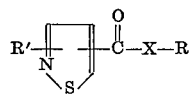

wherein R is selected from the group consisting of hydrogen, saturated and unsaturated primary and secondary aliphatic nitro-substituted, chloro-substituted, and unsubstituted hydrocarbon radicals of one to about fourteen carbon atoms, metals, and protonated amines having up to about six carbon atoms; X is selected from the group consisting of oxygen and sulfur atoms; and R' is selected from the group consisting of hydrogen, methyl, hydroxymethyl, acetoxymethyl, dimethoxymethyl, carboxaldehyde, and carbaldoxime; in admixture with an inert carrier therefor wherein said carrier is a nonvolatile solvent or a finely divided solid and a surface active agent.

2. Composition of claim 1 wherein said aliphatic radicals are unsubstituted hydrocarbon radicals.

3. Composition of claim 1 wherein R' is methyl.

4. Composition of claim 1 wherein R' and

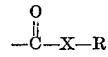

are joined to the isothiazole ring in the 3- and 4-positions of the ring, respectively.

5. Composition of claim 1 wherein R' and

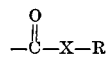

are joined to the isothiazole ring in the 3- and 5-positions of the ring, respectively.

6. Composition of claim 5 wherein R' is methyl.

7. Composition of claim 6 wherein R is lower alkyl.

8. Composition of claim 1 wherein R' and

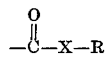

are joined to the isothiazole ring in the 4- and 5-positions of the ring respectively.

9. Composition of claim 1 wherein the compound is 3-methyl-5-isothiazolecarboxylic acid.

10. Composition of claim 1 in which the compound is methyl 3-methyl-4-isothiazolecarboxylate.

11. Composition of claim 1 in which the compound is triethylammonium 3-methyl-5-isothiazolecarboxylate.

12. Composition of claim 1 in which the compound is methyl 3-methyl-5-isothiazolecarboxylate.

13. Composition of claim 1 in which the compound is S-ethyl 3-methyl-5-isothiazolecarboxythiolate.

14. Composition of claim 1 in which the compound is 4-methyl-5-isothiazolecarboxylic acid.

15. Composition of claim 1 wherein the compound is methyl 4-methyl-5-isothiazolecarboxylate.

16. The method of combating plant-infesting pathogenic organisms which comprises applying to the situs of plants an effective amount of an isothiazolecarboxylate of the formula

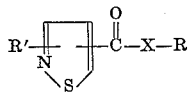

wherein R is selected from the group consisting of hydrogen, saturated and unsaturated primary and secondary aliphatic nitro-substituted, chloro-substituted, and unsubstituted hydrocarbon radicals of one to about fourteen carbon atoms, metals, and protonated amines having up to about six carbon atoms; X is selected from the group consisting of oxygen and sulfur atoms; and R′ is selected from the group consisting of hydrogen, methyl, hydroxymethyl, acetoxymethyl, dimethoxymethyl, carboxaldehyde, and carbaldoxime.

17. The method of claim 16, wherein R′ is methyl.

18. The method of claim 16, wherein R is lower alkyl.

19. The method of claim 16 in which R′ and

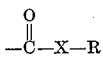

are joined to the ring in the 3- and 4-positions of the ring, respectively.

20. The method of claim 16 in which R′ and

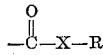

are joined to the ring in the 3- and 5-positions of the ring, respectively.

21. The method of claim 16 in which R′ and

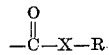

are joined to the ring in the 4- and 5-positions of the ring, respectively.

22. The method of claim 16 in which the compound is methyl 3-methyl-4-isothiazolecarboxylate.

23. The method of claim 16 in which the compound is methyl 4-methyl-5-isothiazolecarboxylate.

24. The method of claim 16 in which the compound is methyl 3-methyl-5-isothiazolecarboxylate.

25. The method of claim 16 in which the compound is S-ethyl 3-methyl-5-isothiazolecarboxythiolate.

26. The method of claim 16 in which the compound is 3-methyl-5-isothiazolecarboxylic acid.

References Cited

Buttimore, Chem. Abst. 58, p. 101 88C (1902).

ALBERT T. MEYERS, *Primary Examiner.*

S. J. FRIEDMAN, *Assistant Examiner.*